United States Patent Office  3,575,977
Patented Apr. 20, 1971

3,575,977
7-ALKYL-2,5-DISUBSTITUTED-7H-PYRROLO-[2,3-d]PYRIMIDINES-6-CARBONITRILES
Dong H. Kim, Wayne, and Arthur A. Santilli, Havertown, Pa., assignors to American Home Products Corporation, New York, N.Y.
No Drawing. Filed Aug. 14, 1968, Ser. No. 752,486
Int. Cl. C07d 57/14
U.S. Cl. 260—256.4                    4 Claims

ABSTRACT OF THE DISCLOSURE

The disclosure is directed to 7-alkyl-2,5,6-trisubstituted-7H-pyrrolo[2,3-d]pyrimidiness and to the 4-[(cyanomethyl)alkylamino] - 2 - substituted - 5-pyrimidine carboxylic acid esters which are intermediates in their production. The compounds have central nervous system activity as depressants.

---

This invention relates to new and useful pyrimidine and pyrrolo[2,3-d]pyrimidine derivatives. More particularly this invention relates to new and novel 7-alkyl-5-hydroxy-2 - substituted - 7H - pyrrolo[2,3-d]pyrimidine-6-carbonitriles, to intermediates in their preparation: 4-[(cyanomethyl)alkylamino] - 2 - substituted - 5-pyrimidinecarboxylic acid esters, and to derivatives of the former compounds: 7 - alkyl - 2,5 - disubstituted-7H-pyrrolo[2,3-d]pyrimidine-6-carbonitriles.

The compounds within the purview of the present invention are exemplified by the 7-alkyl-2,5,6-trisubstituted-7H - pyrrolo[2,3 - d]pyrimidines having the following formula:

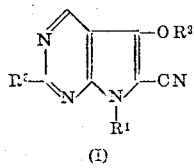

(I)

where $R^1$ is lower alkyl;
$R^2$ is hydrogen, methyl, p-toluenesulfonyl or p-bromobenzenesulfonyl; and
$R^3$ is a lower alkyl, phenyl, halophenyl, lower alkyl phenyl and lower alkoxyphenyl.

As used herein the terms "lower alkyl" and the like, describe groups containing from 1 to about 4 carbon atoms.

A typical example of the compounds of this invention which is depicted by structural Formula I is 7-ethyl-5-hydroxy - 2 - phenyl-7H-pyrrolo[2,3-d]pyrimidine-6-carbonitrile.

Also within the purview of the present invention are the 4-[(cyanomethyl)alkylamino] - 2-substituted - 5 - pyrimidine carboxylic acid esters exemplified by the following formula which, as is explained below, are intermediates in the preparation of the compounds having Formula I:

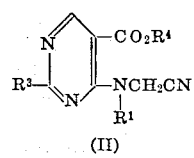

(II)

where $R^1$ and $R^3$ are defined as above; and
$R^4$ is methyl or ethyl.

A typical example of the compounds of this invention which are depicted by structural Formula II is 4-[(cyanomethyl)methylamino] - 2 - phenyl - 5 - pyrimidinecarboxylic acid ethyl ester.

The new and novel compounds of this invention may be prepared by the process which is hereinafter schematically illustrated:

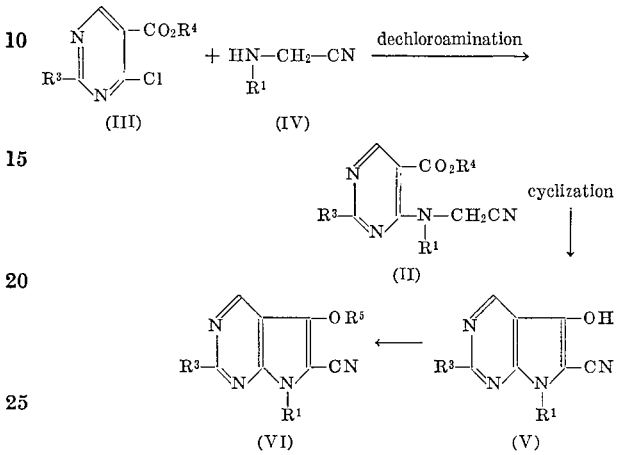

where $R^1$, $R^2$, $R^3$, and $R^4$ are as defined above; and
$R^5$ is methyl, p-toluenesulfonyl or p-bromobenzenesulfonyl.

The 7 - alkyl - 5 - hydroxy-2-substituted-7H-pyrrolo-[2,3-d]pyrimidine-6-carbonitriles (V) of the present invention may be prepared in a two step process. In the first step an alkylamino acetonitrile (IV) and a 5-carbalkoxy-4-chloro-2-substituted pyrimidine (III) are dissolved in a reaction inert organic solvent, such as alkanol or dimethylformamide, and heated at a temperature range of 60 to 150° C., for a period of about ½ to 3 hours, affording the intermediate product, 4-[(cyanomethyl)alkylamino]-2-substituted-5-pyrimidine carboxylic acid ester (II). Preferably the reaction is carried out at the reflux temperature for about one hour in ethanol if $R^4$ is ethyl or in methanol if $R^4$ is methyl.

When the reaction is complete the intermediate product (II) is separated by standard recovery methods. For instance, the inorganic salt may be removed by filtration and the filtrate concentrated under reduced pressure. Chilling of the concentrated solution causes separation of crystals which may be collected by filtration and washed with water to afford the product.

Typical alkylamino-acetonitriles (IV) useful in the practice of the present invention are methylaminoacetonitrile, N-ethylglycinonitrile, n-butylaminoacetonitrile and the like. The acid salts of the compounds may also be used, such as methylaminoacetonitrile hydrochloride, provided the reaction is carried out in the presence of a base.

In the second step the 4-[(cyanomethyl)alkylamino]-2-substituted-5-pyrimidinecarboxylic acid ester (II) is added to a solution of metallic sodium in ethanol where $R^4$ is ethyl, or in methanol where $R^4$ is methyl. The reaction mixture is heated at a temperature range of about 60 to 80 degrees C. for about 15 to 180 minutes, affording the product a 7 - alkyl-5-hydroxy-2-substituted-7H-pyrrolo[2,3-d] pyrimidine-6-carbonitrile (V). Preferably the reaction is carried out at the reflux temperature for about 15 minutes.

While other metals may be used, as is known in the art, sodium and potassium are preferred because they will dissolve in the solvents used in the reaction and because they produce strong bases.

When the reaction is complete the product (V) is separated by standard recovery methods. For instance, the reaction mixture may be evaporated to dryness and the residue dissolved in water, acidified and filtered. The product thus obtained may be recrystallized from an appropriate solvent for instance, ethanol and then from chloroform.

The 7-alkyl-5-hydroxy-2-substituted-7H-pyrrolo[2,3-d]pyrimidine-6-carbonitrile compounds (V) of this invention may be further processed to prepare other useful compounds. For instance, the hydrogen of the 5-hydroxy group may be substituted by methyl or ethyl groups, by conventing the 7 - alkyl - 5-hydroxy-2-substituted-7H-pyrrolo-[2,3-d]pyrimidine-6-carbonitrile (V) to its sodium salt by treating it with sodium methoxide or sodium ethoxide. The sodium salt thus obtained is dissolved in dimethylformamide to which methyl iodide, is added. The resulting solution is stirred for about one-half hour at room temperature affording the product a 7-alkyl-5-methoxy-2-disubstituted - 7H-pyrrolo[2,3-d]pyrimidine-6-carbonitrile having the general Formula VI. When the reaction is complete, the product may be recovered by well known means. For instance, the mixture may be chilled in ice and the precipitate collected on a filter and washed with water. Recrystallization from a solvent, such as dimethylformamide, affords the product.

Other substituents may also be used to replace the hydrogen of the 5-hydroxy group. For instance, p-toluenesulfonylchloride or p-bromobenzenesulfonyl chloride may be dissolved in a reaction inert organic solvent such as ethyl ether and added dropwise with stirring, to an ice cold pyridine solution containing a 7-alkyl-5-hydroxy-2-substituted - 7H - pyrrolo[2,3-d]pyrimidine-6-carbonitrile (V). The resulting mixture is stirred at room temperature for about two hours, and poured into ice water, affording the appropriate 5-tosyl or 5-brosyl derivative product, a 7 - alkyl-2,5-disubstituted-7H-pyrrolo[2,3-d]pyrimidine-6-carbonitrile having the general Formula VI. When the reaction is complete the product may be separated by well known means, for instance the product may be collected by filtration and purified by recrystallization from an organic solvent, such as dimethylformamide, and water to afford the product.

All of the 4-[(cyanomethyl)alkylamino]-2-substituted-5-pyrimidinecarboxylic acid esters (II) may be used as intermediates in the preparation of 7-alkyl-5-hydroxy-2-substituted - 7H - pyrrolo[2,3-d]pyrimidine-6-carbonitriles (V) as described above. Further, it has also been found that the 4 - [(cyanomethyl)alkylamino] - 2-substituted-5-pyrimidinecarboxylic acid esters (II) in which the $R^1$ substituent is lower alkyl having up to three carbon atoms, have central nervous system activity as depressants. That is, they produce a calming effect in the host at an orally administered dose of 127 to 400 milligrams per kilogram of host body weight when tested by the hereafter described pharmacological test as further described below with regard to an intraperitoneally administered dose.

The 7 - alkyl - 2,5,6 - trisubstituted - 7H-pyrrolo[2,3-d]pyrimidines (I) of the present invention have utility in experimental and comparative pharmacology as central nervous system depressants. That is, they produce a calming effect in the host at a dosage of 12.7 to 400 milligrams per kilogram of host body weight as further described below. Surprisingly, the depressant activity is not noticed where the $R^1$ substituent is methyl and the $R^2$ substituent is hydrogen or acetyl.

In the pharmacological evaluation of the biological activity of the compounds of this invention, the in vivo effects are tested as follows. The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) autonomic activity (i.e., miosis, mydriasis, diarrhea) are noted.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE 1

This example illustrates the preparation of 4-[(cyanomethyl)methylamino] - 2-phenyl-5-pyrimidinecarboxylic acid, ethyl ester, a compound of structure II.

A mixture of 10.6 grams (g.) methylaminoacetonitrile hydrochloride and 10 grams of powdered sodium bicarbonate in 70 milliliters (ml.) of absolute ethanol is heated to reflux for ¾ hour (hr.) and with mechanical stirring. 4-chloro-5-carbethoxy-2-phenylpyrimidine (5.2 g.) is added to the mixture and refluxing is continued for 2½ hours. After being cooled to room temperature, the inorganic salt is removed by filtration, and the filtrate is concentrated under reduced pressure. Chilling of the concentrated solution causes separation of crystals which are collected on a filter and washed with water several times. The crude product is recrystallized from absolute ethanol to afford 5.5 g. of product having a melting point of 86–88°.

Based on the formula $C_{16}H_{16}N_4O_2$, it is calculated that the elemental analysis by weight would be 64.85 percent carbon, 5.44 percent hydrogen and 18.91 percent nitrogen. The product is analysed and the content is found to be 65.08 percent carbon, 5.64 percent hydrogen, and 18.91 percent nitrogen. The foregoing may be expressed:

*Analysis.*—Calcd. for $C_{16}H_{16}N_4O_2$ (percent): C, 64.85; H, 5.44; N, 18.91. Found (percent): C, 65.08; H, 5.64; N, 18.91.

EXAMPLE 2

Following the procedure of Example 1 but substituting appropriate starting materials the following compound may be prepared:

(2) 4 - [(cyanomethyl)methylamino] - 2 - (p-ethylphenyl)-5-pyrimidine carboxylic acid, methyl ester.

EXAMPLE 3

This example illustrates the preparation of 4-[(cyanomethyl)ethylamino] - 2 - phenyl-5-pyrimidinecarboxylic acid, ethyl ester, a compound of structure II.

A mixture obtained by dissolving 15 g. of 4-chloro-5-carbethoxy-2-phenylpyrimidine and 28.4 g. of N-ethyl-glycinonitrile in 70 ml. of absolute ethanol is refluxed for 1 hour. The amber solution is treated with charcoal and filtered. Chilling of the product causes separation of crystals which are collected on a filter and washed with water several times to give 14.5 g. of product. Recrystallization from absolute ethanol affords a product having a melting point of 68–70.5° C.

*Analysis.*—Calcd. for $C_{17}H_{18}N_4O_2$ (percent): C, 65.79; H, 5.85; N, 18.05. Found (percent): C, 65.81; H, 6.12; N, 17.85.

EXAMPLES 4–28

Following the procedure of Examples 1–3 but using correspondingly substituted starting materials in equivalent amounts in view of the material used in those examples, the following products may be obtained:

(4) 4-[(cyanomethyl)ethylamino]-2-ethyl-5-pyrimidine carboxylic acid, ethyl ester
(5) 4-[(cyanomethyl)propylamino]-2-methyl-5-pyrimidine carboxylic acid, methyl ester
(6) 2-butyl-4-[(cyanomethyl)methylamino]-5-pyrimidine carboxylic acid, methyl ester
(7) 2-(p-chlorophenyl)-4-[(cyanomethyl)ethylamino]-5-pyrimidine carboxylic acid, methyl ester
(8) 4-[(cyanomethyl)propylamino]-2-(o-fluorophenyl)-5-pyrimidine carboxylic acid, methyl ester
(9) 2-(m-bromophenyl)-4-[butyl(cyanomethyl)amino]-5-pyrimidine carboxylic acid, ethyl ester
(10) 4-[(cyanomethyl)methylamino]-2-(p-iodophenyl)-5-pyrimidine carboxylic acid, ethyl ester
(11) 4-[(cyanomethyl)ethylamino]-2-(m-tolyl)-5-pyrimidine carboxylic acid, methyl ester
(12) 2-(p-butylphenyl)-4-[(cyanomethyl)propylamino]-5-pyrimidine carboxylic acid, ethyl ester
(13) 2-(p-butoxyphenyl)-4-[butyl(cyanomethyl)amino]-5-pyrimidine carboxylic acid, methyl ester
(14) 4-[(cyanomethyl)methylamino]-2-(m-ethoxyphenyl)-5-pyrimidine carboxylic acid, methyl ester
(15) 4-[(cyanomethyl)ethylamino]-2-(o-methoxyphenyl)-5-pyrimidine carboxylic acid, methyl ester
(16) 2-butyl-4-[butyl(cyanomethyl)amino]-5-pyrimidine carboxylic acid, ethyl ester
(17) 2-(p-chlorophenyl)-4-[(cyanomethyl)methylamino]-5-pyrimidine carboxylic acid, ethyl ester
(18) 4-[(cyanomethyl)ethylamino]-2-(p-fluorophenyl)-5-pyrimidine carboxylic acid, ethyl ester
(19) 2-(p-bromophenyl)-4-[(cyanomethyl)propylamino]-5-pyrimidine carboxylic acid, methyl ester
(20) 4-[butyl(cyanomethyl)amino]-2-(p-iodophenyl)-5-pyrimidine carboxylic acid, methyl ester
(21) 4-[(cyanomethyl)methylamino]-2-(p-tolyl)-5-pyrimidine carboxylic acid, ethyl ester
(22) 2-(p-butylphenyl)-4-[(cyanomethyl)ethylamino]-5-pyrimidine carboxylic acid, ethyl ester
(23) 2-(p-butoxyphenyl)-4-[(cyanomethyl)propylamino]-5-pyrimidine carboxylic acid, methyl ester
(24) 4-[butyl(cyanomethyl)amino]-2-(p-ethoxyphenyl)-5-pyrimidine carboxylic acid, methyl ester
(25) 4-[(cyanomethyl)methylamino]-2-(p-methoxyphenyl)-5-pyrimidine carboxylic acid, methyl ester
(26) 4-[butyl(cyanomethyl)amino]-2-(p-ethoxyphenyl)-5-pyrimidine carboxylic acid, ethyl ester
(27) 4-[(cyanomethyl)propylamino]-2-ethyl-5-pyrimidine carboxylic acid, ethyl ester
(28) 4[butyl(cyanomethyl)amino]-2-(p-tolyl)-5-pyrimidine carboxylic acid, ethyl ester

EXAMPLE 29

This example illustrates the preparation of 4-[butyl-(cyanomethyl)amino]-2-phenyl-5-pyrimidinecarboxylic acid, ethyl ester, a compound of structure II.

A mixture obtained by dissolving 13 g. of 4-chloro-5-carbethoxy-2-phenylpyrimidine and 25 g. of n-butylaminoacetonitrile in 100 ml. of absolute ethanol is refluxed for 45 minutes; then the excess ethanol is removed under reduced pressure to give an oil. Chilling of the oily residue with scratching causes crystallization. The product is collected on a filter and washed with water, then with methanol. The product weighs 13.5 g. and melts at 82–84° C.

*Analysis.*—Calcd. for $C_{19}H_{22}N_4O_2$ (percent): C, 67.43; H, 6.55; N, 16.56. Found (percent): C, 67.73; H, 6.43; N, 16.73.

EXAMPLE 30

This example illustrates the preparation of 5-hydroxy-7-methyl - 2-phenyl-7H-pyrrolo[2,3-d]pyrimidine-6-carbonitrile, a compound of structures I and V.

4 - [(cyanomethyl)methylamino] - 2-phenyl-5-pyrimidinecarboxylic acid, ethyl ester (2.9 g.) is added to a solution containing 0.23 g. of sodium in 45 ml. of absolute ethanol, and the resulting mixture is refluxed for 15 minutes. The reaction mixture is concentrated under reduced pressure and chilled in ice. The precipitate is collected on a filter and dissolved in 70 ml. of hot water. Acidification of the solution with 3 N HCl to about pH 2 causes separation of the product which is collected on a filter. The product weighs 2.3 g. and melts at 279–281° C. and decomposes in the melting range. Recrystallization from absolute ethanol affords a product which melts at 280–283° C. and decomposes in the melting range.

*Analysis.*—Calcd. for $C_{14}H_{10}N_4O$ (percent): C, 67.19; H, 4.03; N, 22.39. Found (percent): C, 67.03; H, 4.06; N, 22.49

EXAMPLE 31

This example illustrates the preparation of 7-ethyl-5-hydroxy - 2-phenyl-7H-pyrrolo[2,3-d]pyrimidine-6-carbonitrile, a compound of structures I and V.

7 - ethyl-5-hydroxy-2-phenyl-7H-pyrrolo[2,3-d]pyrimidine-6-carbonitrile is prepared as in Example 30 from 4-[(cyanomethyl) - ethylamino] - 2-phenyl-5-pyrimidinecarboxylic acid, ethyl ester by treating with sodium ethoxide in ethanol. The crude product is recrystallized from 95 percent ethanol, then from chloroform, has a melting point of 208° C. and decomposes at the melting point.

*Analysis.*—Calcd. for $C_{15}H_{12}N_4O$ (percent): C, 68.17; H, 4.58; N, 21.20. Found (percent): C, 68.00; H, 4.63; N, 21.30.

EXAMPLE 32

This example illustrates the preparation of 7-butyl-5-hydroxy - 2-phenyl-7H-pyrrolo[2,3-d]pyrimidine-6-carbonitrile, a compound of structures I and V A mixture containing 11.1 g. of 4-[butyl(cyanomethyl)amino]-2-phenyl-5-pyrimidinecarboxylic acid, ethyl ester and 0.69 g. of sodium in 150 ml. of absolute ethanol is refluxed for 1 hour. The excess ethanol is removed under reduced pressure to dryness, and the residue is dissolved in hot water and ethanol. Acidification of the solution with 3 N HCl to about pH 3 causes separation of a precipitate which is collected on a filter and washed with water to give 10.1 g. of product having a melting point of 168–172° C. Recrystallizations from 95% ethanol increases the melting point to 189–191° C.

*Analysis.*—Calculated for $C_{17}H_{16}N_4O$ (percent): C, 69.84; H, 5.52; N, 19.17. Found (percent): C, 69.56; H, 5.46; N, 19.37.

EXAMPLE 33

This example illustrates the preparation of 5-hydroxy-7-methyl - 2-phenyl-7H-pyrrolo[2,3-d]pyrimidine-6-carbonitrile, acetate, a compound of structures I and VI A mixture of 5-hydroxy-7-methyl-2-phenyl-7H-pyrrolo-[2,3-d]pyrimidine-6-carbonitrile (1.5 g.) and 45 ml. of acetic anhydride is refluxed for 1 hour, then chilled in ice. The crystalline product is collected on a filter. The product weighs 1.8 g. and melts at 184–188° C. Recrystallization from acetic anhydride affords a product having a melting point of 188–190.5° C.

*Analysis.*—Calcd. for $C_{16}H_{12}N_4O_2$ (percent): C, 65.75; H, 4.14; N, 19.17. Found (percent): C, 65.80; H, 4.01; N, 19.48.

EXAMPLE 34

This example illustrates the preparation of 5-methoxy-7-methyl - 2-phenyl-7H-pyrrolo[2,3-d]pyrimidine-6-carbonitrile, a compound of structures I and VI.

5 - hydroxy - 7-methyl-2-phenyl-7H-pyrrolo[2,3-d]-pyrimidine-6-carbonitrile is converted to its sodium salt by treating it with equal mole of sodium ethoxide in ethanol, followed by removal of the excess ethanol in vacuo. The sodium salt (1.7 g.) thus obtained is dissolved in 20 ml. of dimethylformamide, to which is added 1.4 g. of methyliodide. The resulting solution is stired for ½ hour at room temperature. At this point the dark orange color disappears and crystals separate. The mixture is chilled in ice. The precipitate is collected on a filter, and washed with water. Addition of water to the filtrate causes separation of more product. The combined product weighs 1.2 g. and melts at 176–179° C. Recrystallization from dimethylformamide affords a product having a melting point of 178–180.5° C.

*Analysis.*—Calcd. for $C_{15}H_{12}N_4O$ (percent): C, 68.17; H, 4.58; N, 21.20. Found (percent): C, 68.07; H, 4.66; N, 20.88.

EXAMPLES 35–45

Proceeding as described in Example 34 but substituting appropriate starting materials, the following products are afforded:

(35) 5-methoxy-2-methyl-7-propyl-7H-pyrrolo[2,3-d] pyrimidine-6-carbonitrile.
(36) 2-butyl-5-methoxy-7-methyl-7H-pyrrolo[2,3-d]-pyrimidine-6-carbonitrile.
(37) 2-(p-chlorophenyl)-7-ethyl-5-methoxy-7H-pyrrolo-[2,3-d]pyrimidine-6-carbonitrile.
(38) 2-(o-fluorophenyl)-5-methoxy-7-propyl-7H-pyrrolo[2,3-d]pyrimidine-6-carbonitrile.
(39) 2-(m-bromophenyl)-7-butyl-5-methoxy-7H-pyrrolo-[2,3-d]pyrimidine-6-carbonitrile.
(40) 2-(p-iodophenyl)-5-methoxy-7-methyl-7H-pyrrolo-[2,3-d]pyrimidine-6-carbonitrile.
(41) 7-ethyl-5-methoxy-2-(m-tolyl)-7H-pyrrolo-[2,3-d] pyrimidine-6-carbonitrile.
(42) 2-(p-butylphenyl)-5-methoxy-7-propyl-7H-pyrrolo[2,3-d]pyrimidine-6-carbonitrile.
(43) 2-(p-butoxyphenyl)-7-butyl-5-methoxy-7H-pyrrolo-[2,3-d]pyrimidine-6-carbonitrile.
(44) 2-(m-ethoxyphenyl)-5-methoxy-7-methyl-7H-pyrrolo[2,3-d]pyrimidine-6-carbonitrile.
(45) 7-ethyl-5-methoxy-2-(o-methoxyphenyl)-7H-pyrrolo[2,3-d]pyrimidine-6-carbonitrile.

EXAMPLE 46

This example illustrates the preparation of 7-methyl-2-phenyl-5-(p - tolylsulfonyl)-7H-pyrrolo[2,3-d]pyrimidine-6-carbonitrile, a compound of structures I and VI.

Two and three-tenths grams of p-toluenesulfonylchloride dissolved in 15 ml. of ether is added dropwise and with stirring to an ice-cold pyridine solution (30 ml.) containing 2.5 g. of 5-hydroxy-7-methyl-2-phenyl-7H-pyrrolo[2,3-d]pyrimidine - 6 - carbonitrile. The resulting mixture is stirred at room temperature for 2 hours, then poured into ice water whereby a solid is deposited. The precipitate is collected on a filter and recrystallized from dimethylformamide and water to give 2.2 g. of product having a melting point of 194.5 to 197.5° C.

*Analysis.*—Calcd. for $C_{21}H_{16}N_4O_3S$ (percent): C, 62.63; H, 3.99; N, 13.85; S, 7.93. Found (percent): C, 62.64; H, 4.03; N, 13.84; S, 7.78.

EXAMPLES 47–49

Following the procedure of Example 46 but substituting appropriate starting materials, the following products are afforded:

(47) 5-(p-bromobenzenesulfonyl)-7-methyl-2-phenyl-7H-pyrrolo[2,3-d]pyrimidine-6-carbonitrile.
(48) 2-ethyl-7-propyl-5-(p-tolylsulfonyl)-7H-pyrrolo-[2,3-d]pyrimidine-6-carbonitrile.
(49) 5-(p-bromobenzenesulfonyl)-7-butyl-2-(p-tolyl)-7H-pyrrolo[2,3-d]pyrimidine-6-carbonitrile.

The terms and expressions which have been employed are used as terms of description and not of limitation, and there is not intention in the use of such terms and expressions of excluding any equivalents of the features shown and described or portions thereof, but it is recognized that various modifications are possible within the scope of the invention claimed.

What is claimed is:
1. A compound selected from those having the formula:

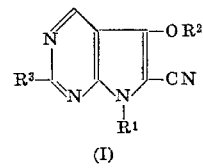

(I)

where
$R^1$ is lower alkyl;
$R^2$ is selected from the group consisting of hydrogen and methyl; and
$R^3$ is selected from the group consisting of lower alkyl, phenyl, halophenyl, lower alkylphenyl and lower alkoxyphenyl.

2. A compound as defined in claim 1 which is 7-ethyl-5 - hydroxy-2-phenyl-7H-pyrrolo[2,3-d]pyrimidine-6-carbonitrile.

3. A compound as defined in claim 1 which is 7-butyl-5 - hydroxy-2-phenyl-7H-pyrrolo[2,3-d]pyrimidine-6-carbonitrile.

4. A compound as defined in claim 1 which is 5-methoxy-7-methyl - 2 - phenyl-7H-pyrrolo[2,3-d]pyrimidine-6-carbonitrile.

References Cited

UNITED STATES PATENTS 3,311,628    3/1967    Partyka _____ 260—256.4

ALEX MAZEL, Primary Examiner

R. J. GALLAGHER, Assistant Examiner

U.S. Cl. X.R.

260—256.5; 424—251